United States Patent
Iwami et al.

(10) Patent No.: US 7,281,995 B2
(45) Date of Patent: Oct. 16, 2007

(54) THREE-PIECE SOLID GOLF BALL

(75) Inventors: Satoshi Iwami, Kobe (JP); Takashi Sasaki, Kobe (JP); Akira Kato, Kobe (JP)

(73) Assignee: SRI Sports Limited, Kobe (JP)

( * ) Notice: Subject to any disclaimer, the term of this patent is extended or adjusted under 35 U.S.C. 154(b) by 0 days.

(21) Appl. No.: 10/160,043

(22) Filed: Jun. 4, 2002

(65) Prior Publication Data

US 2003/0073514 A1    Apr. 17, 2003

(30) Foreign Application Priority Data

Jun. 4, 2001    (JP)    ............................. 2001-168049

(51) Int. Cl.
*A63B 37/04*    (2006.01)
*A63B 37/06*    (2006.01)

(52) U.S. Cl. ...................... 473/371; 473/365

(58) Field of Classification Search ................ 473/374, 473/373, 378, 384, 377
See application file for complete search history.

(56) References Cited

U.S. PATENT DOCUMENTS

| 4,045,269 | A | * | 8/1977 | Voss et al. .................. 156/221 |
|---|---|---|---|---|
| 4,248,432 | A |   | 2/1981 | Hewitt et al. |
| 5,484,870 | A | * | 1/1996 | Wu ............................. 473/378 |
| 5,782,707 | A | * | 7/1998 | Yamagishi et al. ......... 473/373 |
| 5,783,293 | A | * | 7/1998 | Lammi ........................ 428/212 |
| 5,792,008 | A | * | 8/1998 | Kakiuchi et al. ........... 473/354 |
| 5,863,264 | A | * | 1/1999 | Yamagishi et al. .. 273/DIG. 20 |
| 5,929,189 | A |   | 7/1999 | Ichikawa et al. |
| 6,476,176 | B1 | * | 11/2002 | Wu ............................. 528/76 |
| 6,638,184 | B2 | * | 10/2003 | Nesbitt et al. .............. 473/372 |

FOREIGN PATENT DOCUMENTS

JP    9-271538    10/1997

* cited by examiner

*Primary Examiner*—Glenn Caldarola
*Assistant Examiner*—Tom Duong
(74) *Attorney, Agent, or Firm*—Birch, Stewart, Kolasch & Birch, LLP

(57) ABSTRACT

The present invention provides a three-piece solid golf ball having excellent shot feel, controllability, rebound characteristics, scuff resistance, yellowing resistance and productivity. The present invention relates to a three-piece solid golf ball comprising a core composed of a center and an intermediate layer formed on the center, and a cover formed on the core, wherein the cover comprises a mixture of polyurethane-based thermoplastic elastomer and polyamide-based thermoplastic elastomer as a base resin.

5 Claims, 1 Drawing Sheet ns No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.
THREE-PIECE SOLID GOLF BALL

FIELD OF THE INVENTION

The present invention relates to a three-piece solid golf ball. More particularly, it relates to a three-piece solid golf ball having excellent shot feel, controllability, rebound characteristics, scuff resistance, yellowing resistance and productivity.

BACKGROUND OF THE INVENTION

Recently, ionomer resin has been widely used for cover material of golf balls. This is because the ionomer resin is superior in rebound characteristics, durability, productivity and the like. However, since the ionomer resin has high rigidity and hardness, there are problems that in the resulting golf ball, shot feel is hard and poor; and spin performance is not sufficiently obtained, which degrades controllability, when using ionomer resin as the cover material.

In order to improve the problems, it is attempted to soften the ionomer resin by various means. For example, it is proposed to blend the hard ionomer resin having high rigidity with terpolymer-based soft ionomer resin (Japanese Patent Kokai Publications No. 3931/1993, Japanese Patent No. 2709950 and the like) or blend the hard ionomer resin with thermoplastic elastomer (Japanese Patent Kokai Publications Nos. 299052/1994, 327794/1994 and the like) to soften the cover.

However, when good shot feel and spin performance are accomplished in case of the blend of the hard ionomer with the soft ionomer resin is used, rebound characteristics of the resulting golf ball are largely degraded. In addition, since the surface of the cover of the golf ball is easily abraded by grooves on a face surface of the golf club when hit by an iron club, it is problem that the surface of the golf ball becomes fluffy or begins to split finely, and scuff resistance is poor.

When the blend of the hard ionomer with the thermoplastic elastomer is used, rebound characteristics are excellent compared with the blend with the soft ionomer resin, but the compatibility between the both is poor, and scuff resistance when hit by an iron club is poor compared with the blend with the soft ionomer resin.

In order to solve the problems, it has been suggested to use thermosetting polyurethane composition (Japanese Patent Kokai Publication Nos. 74726/1976, 241881/1992, U.S. Pat. No. 4,123,361 and the like), or polyurethane-based thermoplastic elastomer (U.S. Pat. No. 3,395,109, 4,248, 432, Japanese Patent Kokai publication Nos. 271538/1997, 1280401/1999, 1280402/1999 and the like) as a cover material of golf ball. When the thermosetting polyurethane composition is used for the cover material, the scuff resistance, which is problem from using the blend of the hard ionomer resin with the soft ionomer resin or thermoplastic elastomer, is excellent. However, since a process of coating a cover on a core is complicated, large-scale production is difficult, and the productivity is degraded.

When the polyurethane-based thermoplastic elastomer is used for the cover material, compared with the thermosetting polyurethane composition, the productivity is improved, but shot feel, controllability and rebound characteristics of the resulting golf ball are not sufficiently obtained. When polyurethane-based thermoplastic elastomer formed by using typical diisocyanates, such as 2,4-tolylene diisocyanate, 2,6-tolylene diisocyanate or a mixture thereof (TDI), 4,4'-diphenylmethane diisocyanate (MDI) and the like, is used for the cover material, its strength is high, and scuff resistance of the resulting golf ball is excellent, but there is problem that yellowing is easy to occur, and it is required to further use white paint. In order to solve the problem, it has been suggested to use polyurethane-based thermoplastic elastomer formed by using aliphatic diisocyanate for the cover material (Japanese Patent Kokai publication No. 271538/1997). However, there is problem that its strength is low, and scuff resistance of the resulting golf ball is degraded, compared with the polyurethane-based thermoplastic elastomer formed by using aromatic diisocyanate.

OBJECTS OF THE INVENTION

A main object of the present invention is to provide a golf ball having excellent shot feel, controllability, rebound characteristics, scuff resistance, yellowing resistance and productivity.

According to the present invention, the object described above has been accomplished by using a mixture of polyurethane-based thermoplastic elastomer and polyamide-based thermoplastic elastomer as a base resin of the cover, thereby providing a golf ball having excellent shot feel, controllability, rebound characteristics, scuff resistance, yellowing resistance and productivity.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accomplishing drawings which are given by way of illustrating only, and thus are not limitative of the present invention, and wherein.

SUMMARY OF THE INVENTION

Figure 1:
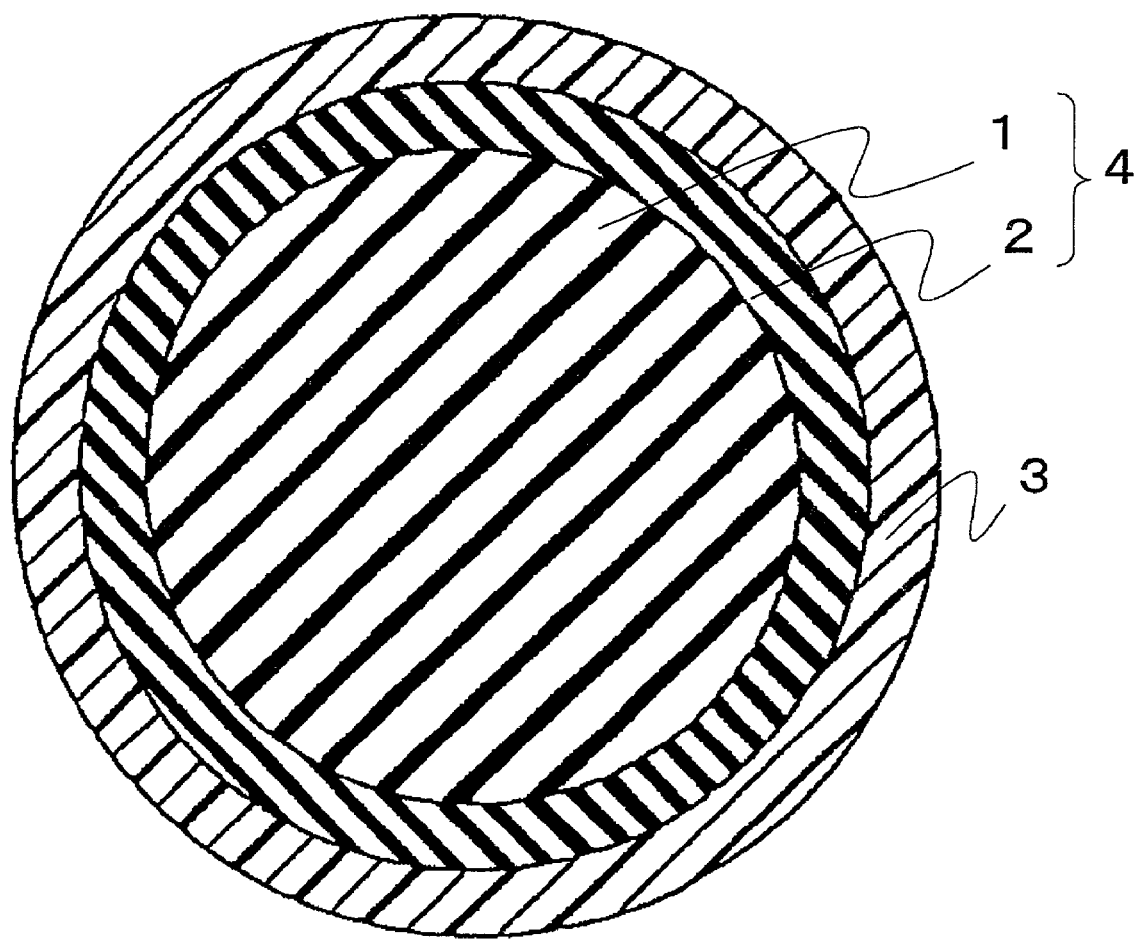
FIG. 1 is a schematic cross section illustrating one embodiment of the golf ball of the present invention.

The present invention relates to a three-piece solid golf ball comprising a core composed of a center and an intermediate layer formed on the center, and a cover formed on the core, wherein the cover comprises a mixture of polyurethane-based thermoplastic elastomer and polyamide-based thermoplastic elastomer as a base resin.

In order to put the present invention into a more suitable practical application, it is desired that the polyurethane-based thermoplastic elastomer be formed by using cycloaliphatic diisocyanate;
the cycloaliphatic diisocyanate be at least one selected from the group consisting of 4,4'-dicyclohexylmethane diisocyanate, 1,3-bis(isocyanatomethyl)cyclohexane, isophorone diisocyanate, and trans-1,4-cyclohexane diisocyanate; and
the cover have a Shore D hardness of 35 to 55.

DETAILED DESCRIPTION OF THE INVENTION

The three-piece solid golf ball of the present invention will be explained with reference to the accompanying drawing in detail. FIG. 1 is a schematic cross section illustrating one embodiment of the three-piece solid golf ball of the present invention. As shown in FIG. 1, the golf ball of the present invention comprises a core 4 composed of a center 1 and an intermediate layer 2 formed on the center, and a cover 3 formed on the core 4. The center 1 of the golf ball of the present invention is formed from a rubber composition comprising a base rubber, a co-crosslinking agent, an organic peroxide, a filler and the like.

The base rubber used in the present invention may be synthetic rubber, which has been conventionally used for cores of solid golf balls. Preferred is so-called high-cis polybutadiene rubber containing a cis-1, 4 bond of not less than 40%, preferably not less than 80%. The high-cis polybutadiene rubber may be optionally mixed with natural rubber, polyisoprene rubber, styrene-butadiene rubber, ethylene-propylene-diene rubber (EPDM) and the like.

The co-crosslinking agent is not limited, but includes a metal salt of α,β-unsaturated carboxylic acid, including mono or divalent metal salts, such as zinc or magnesium salts of α,β-unsaturated carboxylic acids having 3 to 8 carbon atoms (e.g. acrylic acid, methacrylic acid, etc.). The preferred co-crosslinking agent is zinc acrylate, because it imparts high rebound characteristics to the resulting golf ball. The amount of the co-crosslinking agent is preferably from 15 to 45 parts by weight, more preferably from 25 to 40 parts by weight, based on 100 parts by weight of the base rubber. When the amount of the co-crosslinking agent is smaller than 15 parts by weight, the center is too soft, and the rebound characteristics are degraded, which reduces the flight distance. On the other hand, when the amount of the co-crosslinking agent is larger than 45 parts by weight, the center is too hard, and the shot feel of the resulting golf ball is poor.

The organic peroxide, which acts as a crosslinking agent or curing agent, includes, for example, dicumyl peroxide, 1,1-bis (t-butylperoxy)-3,3,5-trimethylcyclohexane, 2,5-dimethyl-2,5-di(t-butylperoxy) hexane, di-t-butyl peroxide and the like. The preferred organic peroxide is dicumyl peroxide. The amount of the organic peroxide is preferably from 0.05 to 3.0 parts by weight, more preferably from 0.1 to 1.5 parts by weight, based on 100 parts by weight of the base rubber. When the amount of the organic peroxide is smaller than 0.05 parts by weight, the center is too soft, and the rebound characteristics are degraded, which reduces the flight distance. On the other hand, when the amount of the organic peroxide is larger than 3.0 parts by weight, the center is too hard, and the shot feel of the resulting golf ball is poor.

The filler, which can be typically used for the core of solid golf ball, includes, for example, inorganic filler (such as zinc oxide, barium sulfate, calcium carbonate and the like), high specific gravity metal powder filler (such as tungsten powder, molybdenum powder and the like), and the mixture thereof. The amount of the filler is from 1 to 30 parts by weight, more preferably from 5 to 20 parts by weight, based on 100 parts by weight of the base rubber. When the amount of the filler is smaller than 1 part by weight, it is difficult to adjust the specific gravity of the resulting golf ball, and a proper weight of the resulting golf ball is not sufficiently obtained. On the other hand, when the amount of the filler is larger than 30 parts by weight, the weight ratio of the rubber component in the core is small, and the rebound characteristics are degraded.

The rubber composition for the center 1 of the golf ball of the present invention can contain other components, which have been conventionally used for preparing the core of solid golf balls, such as organic sulfide compound, antioxidant and the like. If used, the amount of the organic sulfide compound is preferably 0.2 to 5.0 parts by weight, based on 100 parts by weight of the base rubber.

The center 1 is obtained by mixing the above rubber composition, and then vulcanizing and press-molding the mixture in a mold. The vulcanization may be conducted, for example, by press molding in a mold at 130 to 180° C. and 2.9 to 11.8 MPa for 10 to 40 minutes.

It is desired that the center 1 of the golf ball of the present invention have a diameter of 30.0 to 36.0 mm, preferably 31.0 to 35.0 mm, more preferably 31.5 to 34.0 mm. When the diameter of the center 1 is smaller than 30.0 mm, the intermediate layer or cover is thick, and the rebound characteristics are degraded. On the other hand, when the diameter is larger than 36.0 mm, the thickness of the intermediate layer is too thin, and it is difficult to mold it.

In the golf ball of the present invention, it is desired for the center 1 to have a deformation amount when applying from an initial load of 98 N to a final load of 1275 N of 2.80 to 4.50 mm, preferably 2.90 to 4.20 mm, more preferably 3.00 to 4.00 mm. When the deformation amount is smaller than 2.80 mm, the center is too hard, and the shot feel of the resulting golf ball is hard and poor. On the other hand, when the deformation amount is larger than 4.50 mm, the center is too soft, and the shot feel is heavy and poor.

In the golf ball of the present invention, it is desired for the center 1 to have a central point hardness in Shore D hardness of 30 to 45, preferably 32 to 43, more preferably 35 to 42. When the central point hardness is lower than 30, the center is too soft, and the rebound characteristics of the resulting golf ball are degraded. On the other hand, when the central point hardness is higher than 45, the center is too hard, and the shot feel of the resulting golf ball is poor. In addition, the launch angle is small and the spin amount is large, which reduces the flight distance of the resulting golf ball. The term "a central point hardness of the center" as used herein refers to the hardness, which is obtained by cutting the center into two equal parts and then measuring a hardness at the central point in section.

In the golf ball of the present invention, it is desired for the center 1 to have a surface hardness in Shore D hardness of 45 to 60, preferably 47 to 58, more preferably 48 to 57. When the hardness is lower than 45, the center is too soft, and the rebound characteristics of the resulting golf ball are degraded. In addition, the launch angle is small and the spin amount is large, which reduces the flight distance of the resulting golf ball. On the other hand, when the hardness is higher than 60, the center is too hard, and the shot feel of the resulting golf ball is hard and poor. The term "a surface hardness of the center" as used herein refers to the hardness, which is determined by measuring a hardness at the surface of the resulting center. The intermediate layer 2 is then formed on the center 1.

In the golf ball of the present invention, the intermediate layer 2 may be formed from the rubber composition as used in the center 1, or from thermoplastic resin, particularly ionomer resin, which can be typically used for the cover of golf balls, as a base resin. The ionomer resin may be a copolymer of α-olefin and α,β-unsaturated carboxylic acid, of which a portion of carboxylic acid groups is neutralized with metal ion, or a terpolymer of α-olefin, α,β-unsaturated carboxylic acid and α,β-unsaturated carboxylic acid ester, of which a portion of carboxylic acid groups is neutralized with metal ion. Examples of the α-olefins in the ionomer preferably include ethylene, propylene and the like. Examples of the α,β-unsaturated carboxylic acid in the ionomer include acrylic acid, methacrylic acid, fumaric acid, maleic acid, crotonic acid and the like, and preferred are acrylic acid and methacrylic acid. Examples of the α,β-unsaturated carboxylic acid ester in the ionomer include methyl ester, ethyl ester, propyl ester, n-butyl ester and isobutyl ester of acrylic acid, methacrylic acid, fumaric acid, maleic acid, crotonic acid and the like. Preferred are acrylic acid esters and methacrylic acid esters. The metal ion which neutralizes a portion of carboxylic acid groups of the copolymer or terpolymer includes an alkali metal ion, such as a sodium ion, a potassium ion, a lithium ion and the like; a divalent metal ion, such as a zinc ion, a calcium ion, a magnesium ion and the like; a trivalent metal ion, such as an aluminum ion, a neodymium ion and the like; and mixture thereof. Preferred are sodium ions, zinc ions, lithium ions and the like, in view of rebound characteristics, durability and the like.

The ionomer resin is not limited, but examples thereof will be shown by a trade name thereof. Examples of the ionomer resins, which are commercially available from Mitsui Du Pont Polychemical Co., Ltd. include Hi-milan 1555, Hi-milan 1557, Hi-milan 1601, Hi-milan 1605, Hi-milan 1652, Hi-milan 1702, Hi-milan 1705, Hi-milan 1706, Hi-milan 1707, Hi-milan 1855, Hi-milan 1856, Hi-milan AM7316 and the like. Examples of the ionomer resins, which are commercially available from Du Pont Co., include Surlyn 9945, Surlyn 8945, Surlyn 6320, Surlyn 8320, Surlyn AD8511, Surlyn AD8512, Surlyn AD8542 and the like. Examples of the ionomer resins, which are commercially available from Exxon Chemical Co., include Iotek 7010, Iotek 8000 and the like. These ionomer resins may be used alone or in combination.

As the materials suitably used in the intermediate layer 2 of the present invention, the above ionomer resin may be used alone, but the ionomer resin may be used in combination with at least one of thermoplastic elastomer, diene-based block copolymer and the like.

Examples of the thermoplastic elastomers include polyamide-based thermoplastic elastomer, which is commercially available from Toray Co., Ltd. under the trade name of "Pebax" (such as "Pebax 2533"); polyester-based thermoplastic elastomer, which is commercially available from Toray-Do Pont Co., Ltd. under the trade name of "Hytrel" (such as "Hytrel 3548", "Hytrel 4047"); polyurethane-based elastomer, which is commercially available from Takeda Badishes Urethanes Industries, Ltd. under the trade name of "Elastollan" (such as "Elastollan ET880"); and the like.

The diene-based block copolymer is a block copolymer or partially hydrogenated block copolymer having double bond derived from conjugated diene compound. The base bock copolymer is block copolymer composed of block polymer block A mainly comprising at least one aromatic vinyl compound and polymer block B mainly comprising at least one conjugated diene compound. The partially hydrogenated block copolymer is obtained by hydrogenating the block copolymer. Examples of the aromatic vinyl compounds comprising the block copolymer include styrene, α-methyl styrene, vinyl toluene, p-t-butyl styrene, 1,1-diphenyl styrene and the like, or mixtures thereof. Preferred is styrene. Examples of the conjugated diene compounds include butadiene, isoprene, 1,3-pentadiene, 2,3-dimethyl-1,3-butadiene and the like, or mixtures thereof. Preferred are butadiene, isoprene and combinations thereof. Examples of the diene block copolymers include an SBS (styrene-butadiene-styrene) block copolymer having polybutadiene block with epoxy groups or SIS (styrene-isoprene-styrene) block copolymer having polyisoprene block with epoxy groups and the like. Examples of the diene block copolymers which is commercially available include the diene block copolymers, which are commercially available from Daicel Chemical Industries, Ltd. under the trade name of "Epofriend" (such as "Epofriend A1010"), the diene block copolymers, which are commercially available from Kuraray Co., Ltd. under the trade name of "Septon" (such as "Septon HG-252") and the like.

The amount of the thermoplastic elastomer or diene block copolymer is 1 to 60 parts by weight, preferably 1 to 35 parts by weight, based on 100 parts by weight of the base resin for the cover. When the amount is smaller than 1 part by weight, the technical effect of improving the shot feel of the golf ball is not sufficiently obtained. On the other hand, when the amount is larger than 60 parts by weight, the intermediate layer is too soft, and the rebound characteristics of the resulting golf ball are degraded. In addition, the compatibility with the ionomer resin is degraded, and the durability is degraded.

When the intermediate layer 2 is formed from rubber composition, the rubber composition for the intermediate layer is mixed, and coated on the center 1 into a concentric sphere, and then vulcanized by press-molding at 160 to 180° C. for 10 to 20 minutes in the mold to obtain a core 4, which is formed by covering the intermediate layer 2 on the center 1. When the intermediate layer 2 is formed from thermoplastic resin, the resin composition for the intermediate layer is directly injection molded on the center 1 to obtain the core 4. It is preferable for the surface of the resulting core to be buffed to improve the adhesion to the cover formed on the core.

It is desired that the hardness difference in Shore D hardness between intermediate layer 2 and the central point of the center 1 be within the range of not less than 25, preferably 25 to 40, more preferably 30 to 35. When the hardness difference is smaller than 25, a proper initial flight performance is not obtained.

It is desired for the intermediate layer 2 to have a hardness in Shore D hardness of 50 to 80, preferably 52 to 75, more preferably 55 to 70. When the hardness of the intermediate layer is lower than 50, the rebound characteristics are degraded and the launch angle is small, which degrades the flight performance. In addition, the shot feel is poor. On the other hand, when the hardness of the intermediate layer is higher than 80, the intermediate layer is too hard, and the shot feel of the resulting golf ball is hard and poor. The term "a hardness of the intermediate layer" as used herein refers to the surface hardness of the core 4, which is obtained by covering the intermediate layer 2 on the center 1. When the hardness of the intermediate layer 2 is higher than the surface hardness of the center 1, the hardness difference between the central point of the center 1 and the surface of the core 4 is large as a whole of the core 4, and the flight distance is increased by accomplishing high launch angle and low spin amount, while maintaining good shot feel.

It is desired for a thickness of the intermediate layer 2, which is determined depending on the diameter of the center 1 and that of the core 4, to be within the range of 2.0 to 5.0 mm, preferably 2.0 to 4.5 mm, more preferably 2.5 to 4.0 mm. When the thickness of the intermediate layer 2 is smaller than 2.0 mm, it is difficult to mold it. On the other hand, when the thickness is larger than 5.0 mm, the shot feel of the resulting golf ball is hard and poor.

It is desired that the core 4 of the golf ball of the present invention have a diameter of 39.6 to 41.8 mm, preferably 39.8 to 41.4 mm, more preferably 40.4 to 41.2 mm. When the diameter of the core 4 is smaller than 39.6 mm, the cover is too thick, and the rebound characteristics are degraded. On the other hand, when the diameter is larger than 41.8 mm, the thickness of the cover is too thin, and the technical effects accomplished by the presence of the cover are not sufficiently obtained. In addition, it is difficult to mold it.

In the golf ball of the present invention, it is desired for the core 4 to have a deformation amount when applying from an initial load of 98 N to a final load of 1275 N of 2.50 to 3.20 mm, preferably 2.60 to 3.10 mm, more preferably 2.70 to 3.00 mm. When the deformation amount is smaller than 2.50 mm, the core is too hard, and the shot feel of the resulting golf ball is hard and poor. On the other hand, when the deformation amount is larger than 3.20 mm, the core is too soft, and the shot feel is heavy and poor.

The cover 3 is then covered on the core 4. In the golf ball of the present invention, it is required for the cover 3 to comprise a mixture of polyurethane-based thermoplastic elastomer and polyamide-based thermoplastic elastomer as a base resin. If polyurethane-based thermoplastic elastomer, particularly polyurethane-based thermoplastic elastomer formed by using aliphatic diisocyanate or cycloaliphatic diisocyanate having excellent yellowing resistance is used alone as a base resin for the cover 3, the cover composition is too soft at the time of extruding, and it is difficult to cut it. Therefore it is difficult to obtain pelletized cover composition. In addition, there is problem that the resulting golf balls adhere to each other by the tack of the golf ball immediately after molding (injection molding or press molding), which degrades the productivity. It is for the reason that the polyurethane-based thermoplastic elastomer has low crystallinity (low melting point), and the solidification thereof is slow at the state that it is not sufficiently cooled, for example, at the time of extruding, or immediately after molding.

It is possible to solve the problem by mixing the polyurethane-based thermoplastic elastomer with polyamide-based thermoplastic elastomer having high crystallinity, and the productivity is improved. In addition, the melting viscosity of the mixture is low by mixing the polyamide-based thermoplastic elastomer to improve the flowability of the mixture, and the productivity is improved. The rebound characteristics are also improved by mixing the polyamide-based based thermoplastic elastomer. In the present invention, since the polyamide-based thermoplastic elastomer had very good compatibility with the polyurethane-based thermoplastic elastomer compared with the other thermoplastic elastomer, the polyamide-based thermoplastic elastomer was selected among various thermoplastic elastomers.

Polyurethane-based thermoplastic elastomer generally contains polyurethane structure as hard segment and polyester or polyether as soft segment. The polyurethane structure generally contains diisocyanate and curing agent, such as amine-based curing agent. The polyurethane-based thermoplastic elastomer includes polyurethane-based thermoplastic elastomer that the diisocyanate is aromatic diisocyanate, cycloaliphatic diisocyanate or aliphatic diisocyanate.

Examples of the aromatic diisocyanate include tolylene diisocyanate (TDI), 4,4'-diphenylmethane diisocyanate (MDI), 1,5-naphthylene diisocyanate (NDI), tolidine diisocyanate (TODI), xylylene diisocyanate (XDI) and the like. Preferred is MDI. Concrete examples of the polyurethane-based thermoplastic elastomer formed by using the MDI include polyurethane-based thermoplastic elastomer, which is commercially available from BASF Polyurethane Elastomers Co., Ltd. under the trade name of "Elastollan ET890", and the like.

Examples of the cycloaliphatic diisocyanates include one or combination of two or more selected from the group consisting of 4,4'-dicyclohexylmethane diisocyanate ($H_{12}MDI$), which is hydrogenated compound of MDI; 1,3-bis (isocyanatomethyl) cyclohexane ($H_6XDI$), which is hydrogenated compound of XDI; isophorone diisocyanate (IPDI); and trans-1,4-cyclohexane diisocyanate (CHDI). Preferred is the $H_{12}MDI$ in view of general-purpose properties and processability. Concrete examples of the polyurethane-based thermoplastic elastomer formed by using the $H_{12}MDI$ include polyurethane-based thermoplastic elastomers, which are commercially available from BASF Polyurethane Elastomers Co., Ltd. under the trade name of "Elastollan XNY90A", "Elastollan XNY97A", "Elastollan XNY585", and the like.

Examples of the aliphatic diisocyanates include hexamethylene diisocyanate (HDI) and the like. Concrete examples of the polyurethane-based thermoplastic elastomer formed by using the HDI include polyurethane-based thermoplastic elastomer, which is commercially available from Dainippon Ink & Chemicals Inc. under the trade name of "Pandex T-7890" (trade name), and the like.

Preferred are polyurethane-based thermoplastic elastomers formed by using diisocyanate having no double bond in backbone structure in molecule, that is, aliphatic diisocyanate and cycloaliphatic diisocyanate in view of yellowing resistance. Preferred are polyurethane-based thermoplastic elastomers formed by using cycloaliphatic diisocyanate and aromatic diisocyanate, which have high mechanical strength, in view of scuff resistance. Therefore, in the present invention, preferred is polyurethane-based thermoplastic elastomer formed by using cycloaliphatic diisocyanate in view of both the yellowing resistance and scuff resistance.

Polyamide-based thermoplastic elastomer generally contains polyamide as hard segment and polyether or polyester as soft segment. The polyamide-based thermoplastic elastomer used for the cover 3 of the golf ball of the present invention may be polyether-polyamide-based thermoplastic elastomer or polyester-polyamide-based thermoplastic elastomer. Preferred is polyether-polyamide-based thermoplastic elastomer. Concrete examples of the polyether-polyamide-based thermoplastic elastomer include polyamide-based thermoplastic elastomer, which is commercially available from Atofina Japan Co., Ltd. under the trade name of "Pebax 5533SN00", and the like.

The blend ratio (a:b) of the urethane-based thermoplastic elastomer (a) to the polyamide-based thermoplastic elastomer (b) in the mixture is 95:5 to 60:40, preferably 90:10 to 70:30, more preferably 90:10 to 80:20. When the amount of the polyamide-based thermoplastic elastomer is smaller than 5% by weight, the technical effects accomplished by blending it are not sufficiently obtained. On the other hand, when the amount is larger than 40% by weight, the scuff resistance of the resulting golf ball is degraded.

The cover composition used in the present invention may optionally contain pigments (such as titanium dioxide, etc.) and the other additives such as a dispersant, an antioxidant, a UV absorber, a photostabilizer and a fluorescent agent or a fluorescent brightener, etc., in addition to the above resin component as long as the addition of the additives does not deteriorate the desired performance of the golf ball cover. If used, the amount of the pigment is preferably 0.1 to 5 parts by weight, based on 100 parts by weight of the resin component for the cover.

A method of covering on the core with the cover is not specifically limited, but may be a conventional method. For example, there can be used a method comprising molding the cover composition into a semi-spherical half-shell in advance, covering the core with the two half-shells, followed by press molding at 160 to 200° C. for 1 to 10 minutes, or a method comprising injection molding the cover composition directly on the core, which is covered with the cover, to cover it.

In the golf ball of the present invention, it is desired for the cover 3 to have a thickness of 0.5 to 1.6 mm, preferably 0.7 to 1.5 mm, more preferably 0.8 to 1.4 mm. When the thickness is smaller than 0.5 mm, the cover is too thin, and it is difficult to mold the cover such that the resulting golf ball is shaped into a true sphere. On the other hand, when the thickness is larger than 1.6 mm, the cover is too thick, and the rebound characteristics of the resulting golf ball are poor.

In golf ball of the present invention, it is desired for the cover 3 to have a Shore D hardness of 35 to 55, preferably 40 to 50, more preferably 42 to 48. When the hardness is lower than 35, the cover is too soft, and there is problem at manufacturing process described above, such as pelletizing performance. On the other hand, when the hardness is higher than 55, the cover is too hard, and the shot feel is hard and poor. The term "a hardness of the cover" as used herein refers to the hardness measured using a sample of a heat and press molded sheets from the cover composition.

At the time of molding the cover, many depressions called "dimples" may be optionally formed on the surface of the golf ball. Furthermore, paint finishing or marking with a stamp may be optionally provided after the cover molded for commercial purposes.

In the golf ball of the present invention, it is desired to have a deformation amount when applying from an initial load of 98 N to a final load of 1275 N of 2.50 to 3.20 mm, preferably 2.60 to 3.10 mm, more preferably 2.65 to 2.90 mm. When the deformation amount is smaller than 2.50 mm, the golf ball is too hard, and the shot feel is hard and poor. On the other hand, when the deformation amount is larger than 3.20 mm, the golf ball is too soft, and the shot feel is heavy and poor.

The golf ball of the present invention is formed, so that it has a diameter of not less than 42.67 mm (preferably 42.67 to 43 mm) and a weight of not more than 45.93 g, in accordance with the regulations for golf balls.

EXAMPLES

The following Examples and Comparative Examples further illustrate the present invention in detail but are not to be construed to limit the scope of the present invention.

Production of Core
(i) Production of Center
The rubber composition for the center having the formulation shown in Table 1 was mixed, and then vulcanized by press-molding at 165° C. for 20 minutes in the mold to obtain spherical center. The diameter and deformation amount of the resulting center were measured, and the results are shown in the same Table.

(ii) Production of Two-Layer Structured Core
(Core Composition I)
The rubber composition for the intermediate layer having the formulation shown in Table 1 was mixed, and coated on the center produced in the step (i) into a concentric sphere, and then vulcanized by press-molding at 165° C. for 20 minutes in the mold to obtain two-layer structured core.

(Core Composition II)
The composition for the intermediate layer having the formulation shown in Table 1 was directly injection molded on the center produced in the step (i) to obtain two-layer structured core. The diameter and deformation amount of the resulting two-layer structured core were measured, and the results are shown in the same Table.

TABLE 1

|  |  | Core | |
|---|---|---|---|
|  |  | I | II |
| (Center composition) | | | |
| BR-18 | *1 | 100 | 100 |
| Zinc acrylate | | 32 | 30 |
| Zinc oxide | | 5 | 5 |
| Barium sulfate | | 7 | 7 |
| Dicumyl peroxide | | 0.7 | 0.7 |
| Diphenyl disulfide | | 0.5 | 0.5 |
| Diameter of center(mm) | | 31.5 | 31.5 |
| Deformation amount of center (mm) | | 3.9 | 4.1 |
| (Intermediate layer composition) | | | |
| BR-11 | *1-2 | 100 | — |
| Zinc acrylate | | 37 | — |
| Zinc oxide | | 5 | — |
| Barium sulfate | | 4.8 | — |
| Dicumyl peroxide | | 0.5 | — |
| Diphenyl disulfide | | 0.5 | — |
| Hi-milan 1605 | *2 | — | 50 |
| Surlyn 9945 | *3 | — | 50 |
| Diameter of core (mm) | | 40 | 40 |
| Deformation amount of core (mm) | | 2.9 | 2.8 |

*1: High-cis polybutadiene commercially available from JSR Co., Ltd., under the trade name "BR-18" (Content of cis-1,4-polybutadiene = 96%)
*1-2: High-cis polybutadiene commercially available from JSR Co., Ltd., under the trade name "BR-11" (Content of cis-1,4-polybutadiene = 96%)
*2: Hi-milan 1605 (trade name), ethylene-methacrylic acid copolymer ionomer resin obtained by neutralizing with sodium ion, manufactured by Du Pont-Mitsui Polychemicals Co., Ltd.
*3: Surlyn 9945 (trade name), ethylene-methacrylic acid copolymer ionomer resin obtained by neutralizing with zinc ion, manufactured by Du Pont Co.

Preparation of Cover Compositions
The formulation materials for the cover showed in Table 2 and Table 3 were mixed using a kneading type twin-screw extruder to obtain pelletized cover compositions. The pelletizing performance of the resulting cover compositions was evaluated, and the results are shown in Table 4 (Examples) and Table 5 (Comparative Examples). The test method is described later. The extrusion condition was,
a screw diameter of 45 mm,
a screw speed of 200 rpm,
a screw L/D of 35.

The formulation materials were heated at 200 to 260° C. at the die position of the extruder. The hardness were determined, using a sample of a stack of the three or more heat and press molded sheets having a thickness of about 2 mm from the cover composition, which had been stored at 23° C. for 2 weeks, with a Shore D hardness meter according to ASTM D 2240-68. The results are shown as a cover hardness in Tables 2 to 5.

TABLE 2

| | | (parts by weight) | | | | | |
|---|---|---|---|---|---|---|---|
| Cover composition | | A | B | C | D | E | F |
| Elastollan XNY90A | *4 | 90 | 80 | 70 | — | — | — |
| Elastollan XNY97A | *5 | — | — | — | 80 | — | — |
| Elastollan ET890 | *6 | — | — | — | — | 80 | — |
| Pandex T-7890 | *7 | — | — | — | — | — | 80 |
| Pebax 5533SNOO | *8 | 10 | 20 | 30 | 20 | 20 | 20 |
| Surlyn 8945 | *9 | — | — | — | — | — | — |
| Hi-milan AM7316 | *10 | — | — | — | — | — | — |
| Titanium dioxide | | 4 | 4 | 4 | 4 | 4 | 4 |
| Cover hardness (Shore D) | | 47 | 47 | 48 | 48 | 46 | 42 |

TABLE 3

| Cover composition | | G | H | J | K | l |
|---|---|---|---|---|---|---|
| | | \multicolumn{5}{c}{(parts by weight)} | | | | | |
| Elastollan XNY90A | *4 | 100 | — | — | — | — |
| Elastollan XNY97A | *5 | — | — | — | — | — |
| Elastollan ET890 | *6 | — | 100 | — | — | — |
| Pandex T-7890 | *7 | — | — | 100 | — | — |
| Pebax 5533SNOO | *8 | — | — | — | 20 | — |
| Surlyn 8945 | *9 | — | — | — | 24 | 30 |
| Hi-milan AM7316 | *10 | — | — | — | 56 | 70 |
| Titanium dioxide | | 4 | 4 | 4 | 4 | 4 |
| Cover hardness (Shore D) | | 41 | 40 | 41 | 46 | 45 |

*4: Elastollan XNY90A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*5: Elastollan XNY97A (trade name), polyurethane-based thermoplastic elastomer formed by using 4,4'-dicyclohexylmethane diisocyanate ($H_{12}$MDI) (=hydrogenated MDI), commercially available from BASF Polyurethane Elastomers Co., Ltd.
*6: Elastollan ET890 (trade name), polyurethane-based thermoplastic elastomer formed by using 4,4'-diphenylmethane diisocyanate (MDI), commercially available from BASF Polyurethane Elastomers Co., Ltd.
*7: Pandex T-7890 (trade name), polyurethane-based thermoplastic elastomer formed by using hexamethylene diisocyanate (HDI), commercially available from Dainippon Ink & Chemicals Inc.
*8: Pebax 5533SNOO (trade name), polyether-polyamide-based thermoplastic elastomer, commercially available from Elf Atochem Japan Co., Ltd.
*9: Surlyn 8945 (trade name), ethylene-methacrylic acid copolymer ionomer resin obtained by neutralizing with sodium ion, manufactured by Du Pont Co.
*10: Hi-milan AM7316 (trade name), ethylene-methacrylic acid-alkyl acrylate terpolymer ionomer resin obtained by neutralizing with zinc ion, manufactured by Du Pont-Mitsui Polychemicals Co., Ltd.

Examples 1 to 7 and Comparative Examples 1 to 5

The cover composition was covered on the core obtained as described above by injection molding to form a cover layer having the thickness shown in Table 4 (Examples) and Table 5 (Comparative Examples). The tack immediately after molding was evaluated, and the results are shown in the same Table. Then, clear paint was coated on the surface of the cover layer to obtain a golf ball having a diameter of 42.8 mm and a weight of 45.3 g. With respect to the resulting golf balls, the deformation amount, coefficient of restitution, flight distance, yellowing resistance and scuff resistance were measured or evaluated. The results are shown in Table 4 (Examples) and Table 5 (Comparative Examples). The test methods are as follows.

(Test Method)

(1) Deformation Amount

The deformation amount is determined by measuring a deformation amount, when applying from an initial load of 98 N to a final load of 1275 N on the center, core or golf ball.

(2) Pelletizing Performance

The cover composition was extruded into circular shape in section, and cut to form pellets by using a pelletizer. The pelletizing performance of the cover composition was evaluated by checking the shape in section of the cut pellet by visual observation. The evaluation criteria are as follows.

Evaluation Criteria

○: The shape in section of the cut pellet is circle.

Δ: The shape in section of the cut pellet is slightly deformed from circle.

x: The shape in section of the cut pellet is largely deformed from circle.

(3) Tack Immediately After Molding

The golf balls immediately after molding were stacked up, and the tack of the golf ball immediately after molding was determined by evaluating the state of adhesion between the golf balls. The evaluation criteria are as follows.

Evaluation Criteria x: The stacked golf balls adhere to each other.

○: The stacked golf balls do not adhere to each other.

(4) Coefficient of Restitution

An aluminum cylinder having a weight of 200 g was struck at a speed of 45 m/sec against a golf ball, and the velocity of the cylinder and the golf ball after the strike were measured. The coefficient of restitution of the golf ball was calculated from the velocity and the weight of both the cylinder and the golf ball. The measurement was conducted 5 times for each golf ball, and the average is shown as the coefficient of restitution of the golf ball.

(5) Flight Performance

A No. 1 wood club (W#1, a driver) having metal head was mounted to a swing robot manufactured by True Temper Co. and the resulting golf ball was hit at a head speed of 45 m/second, the flight distance was measured. As the flight distance, total that is a distance to the stop point of the hit golf ball was measured. The measurement was conducted 12 times for each golf ball (n=5), and the average is shown as the result of the golf ball.

(6) Yellowing Resistance

The resulting golf ball was expose to a sunshine weather meter manufactured by Suga Test Instruments Co., Ltd. for 120 hours. The Lab color difference ($\Delta L$, $\Delta a$ and $\Delta b$) of the surface of the golf ball between before and after the exposure was measured by using a color-difference-colorimeter, which is commercially available from Minolta Co., Ltd. under the trade name "CR-221", and was represented by $\Delta E$. The $\Delta E$ is determined by using the following formula:

$$\Delta E = [(\Delta L)^2 + (\Delta a)^2 + (\Delta b)^2]^{1/2}$$

The larger the value of color difference $\Delta E$ is, the less the yellowing resistance is.

(7) Scuff Resistance

After a pitching wedge (PW) commercially available was mounted to a swing robot manufactured by True Temper Co., two points on the surface of each golf ball was hit at a head speed of 36 m/sec one time for each point. The two points were evaluated by checking the surface appearance by visual observation. The evaluation criteria are as follows.

Evaluation Criteria

○: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

(Test Results)

TABLE 4

| Test item | Example No. | | | | | | |
|---|---|---|---|---|---|---|---|
| | 1 | 2 | 3 | 4 | 5 | 6 | 7 |
| (Core) | | | | | | | |
| Type of core | I | I | II | I | I | I | I |
| Diameter (mm) | 40 | 40 | 40 | 40 | 40 | 40 | 40 |
| Deformation amount (mm) | 2.9 | 2.9 | 2.8 | 2.9 | 2.9 | 2.9 | 2.9 |
| (Cover) | | | | | | | |
| Type of cover | A | B | B | C | D | E | F |
| Thickness (mm) | 1.4 | 1.4 | 1.4 | 1.4 | 1.4 | 1.4 | 1.4 |
| Hardness (Shore D) | 47 | 47 | 47 | 48 | 48 | 46 | 42 |
| (Golf ball) | | | | | | | |
| Deformation amount (mm) | 2.80 | 2.80 | 2.70 | 2.73 | 2.72 | 2.80 | 2.82 |
| Coefficient of restitution | 0.764 | 0.762 | 0.765 | 0.769 | 0.768 | 0.761 | 0.759 |
| Flight distance (m) | 212 | 212 | 212 | 213 | 213 | 211 | 210 |
| Yellowing resistance(ΔE) | 2.1 | 2.1 | 2.1 | 2.1 | 2.0 | 10.2 | 1.9 |
| Scuff resistance | ○ | ○ | Δ | ○ | ○ | ○ | Δ |
| Pelletizing performance | ○ | ○ | ○ | ○ | ○ | ○ | ○ |
| Tack immediately after molding | ○ | ○ | ○ | ○ | ○ | ○ | ○ |

TABLE 5

| Test item | Comparative Example No. | | | | |
|---|---|---|---|---|---|
| | 1 | 2 | 3 | 4 | 5 |
| (Core) | | | | | |
| Type of core | I | I | I | I | I |
| Diameter (mm) | 40 | 40 | 40 | 40 | 40 |
| Deformation amount (mm) | 2.9 | 2.9 | 2.9 | 2.9 | 2.9 |
| (Cover) | | | | | |
| Type of cover | G | H | J | K | L |
| Thickness (mm) | 1.4 | 1.4 | 1.4 | 1.4 | 1.4 |
| Hardness (Shore D) | 41 | 40 | 41 | 46 | 45 |
| (Golf ball) | | | | | |
| Deformation amount (mm) | 2.83 | 2.85 | 2.85 | 2.80 | 2.65 |
| Coefficient of restitution | 0.755 | 0.752 | 0.750 | 0.750 | 0.748 |
| Flight distance (m) | 209 | 208 | 208 | 207 | 207 |
| Yellowing resistance (ΔE) | 1.9 | 10.4 | 1.8 | 2.8 | 2.6 |
| Scuff resistance | ○ | ○ | Δ | x | x |
| Pelletizing performance | x | Δ | Δ | ○ | ○ |
| Tack immediately after molding | x | ○ | x | ○ | ○ |

As is apparent from the results of Tables 4 and 5, the golf balls of the present invention of Examples 1 to 5 and 7, when compared with the golf balls of Comparative Examples 1 to 4, are superior in rebound characteristics, shot feel, controllability, yellowing resistance and scuff resistance. In the golf balls of Example 6, since the polyurethane-based thermoplastic elastomer formed by using aromatic diisocyanate and the polyamide-based thermoplastic elastomer are used as the base resin for the cover, the yellowing resistance is as poor as that of the golf ball of Comparative Example 2 only using the polyurethane-based thermoplastic elastomer formed by using aromatic diisocyanate, but the other properties are better than the golf balls of Comparative Examples.

On the other hand, in the golf balls of Comparative Example 1, since the polyurethane-based thermoplastic elastomer formed by using cycloaliphatic diisocyanate is only used as the base resin for the cover and the polyamide-based thermoplastic elastomer is not used, the scuff resistance is excellent, but the productivity (the pelletizing performance and tack immediately after molding) is poor and the coefficient of restitution is small.

In the golf ball of Comparative Example 2, since the polyurethane-based thermoplastic elastomer formed by using aromatic diisocyanate is only used as the base resin for the cover and the polyamide-based thermoplastic elastomer is not used, the scuff resistance is excellent, but the yellowing is very easy to occur.

In the golf ball of Comparative Example 3, the polyurethane-based thermoplastic elastomer formed by using aliphatic diisocyanate is only used as the base resin for the cover and the polyamide-based thermoplastic elastomer is not used, the yellowing is difficult to occur, but the productivity and the scuff resistance are poor.

In the golf balls of Comparative Example 4, since the blend of low hardness ionomer resin with the polyamide-based thermoplastic elastomer is used as the base resin for the cover, the productivity is excellent, but the coefficient of restitution is small and the scuff resistance is poor.

In the golf balls of Comparative Example 5, since low hardness ionomer resin is only used as the base resin for the cover, the productivity is excellent, but the coefficient of restitution is small and the scuff resistance is poor.

What is claimed is:

1. A three-piece solid golf ball comprising a solid core composed of a vulcanized rubber center formed from a rubber composition and an intermediate layer formed on the center, and a cover formed on the core, wherein the cover comprises a mixture of polyurethane-based thermoplastic elastomer and polyamide-based thermoplastic elastomer as a base resin, wherein the polyurethane-based thermoplastic elastomer is formed by using cycloaliphatic diisocyanate and a blend weight ratio (a:b) of the urethane-based thermoplastic elastomer (a) to the polyamide-based thermoplastic elastomer (b) is 95:5 to 60:40.

2. The golf ball according to claim 1, wherein the cycloaliphatic diisocyanate is at least one selected from the group consisting of 4,4'-dicyclohexylmethane diisocyanate, 1,3-bis(isocyanatomethyl)cyclohexane, isophorone diisocyanate, and trans-1,4-cyclohexane diisocyanate.

3. The golf ball according to claim 1, wherein the cover has a Shore D hardness of 35 to 55.

4. The golf ball according to claim 1, wherein a blend weight ratio (a:b) of the urethane-based thermoplastic elastomer (a) to the polyamide-based thermoplastic elastomer (b) is 90:10 to 70:30.

5. The golf ball according to claim 1, wherein a blend weight ratio (a:b) of the urethane-based thermoplastic elastomer (a) to the polyamide-based thermoplastic elastomer (b) is 95:5 to 80:30.

* * * * *